United States Patent [19]

Horton

[11] 4,184,265

[45] Jan. 22, 1980

[54] THREAD GAGE

[75] Inventor: James Horton, Arcadia, Calif.

[73] Assignee: Hydril Company, Los Angeles, Calif.

[21] Appl. No.: 868,986

[22] Filed: Jan. 12, 1978

[51] Int. Cl.² ............................................. G01B 3/38
[52] U.S. Cl. ................................................ 33/199 R
[58] Field of Search ............ 33/174 L, 199 R, 199 B, 33/172 R

[56] References Cited

U.S. PATENT DOCUMENTS

| 1,614,448 | 1/1927 | Mensforth et al. | 33/199 B |
| 1,864,634 | 6/1932 | Bradford | 33/172 R |
| 3,537,184 | 11/1970 | Hearn | 33/199 R |

FOREIGN PATENT DOCUMENTS

| 390036 | 2/1924 | Fed. Rep. of Germany | 33/199 B |
| 483605 | 9/1929 | Fed. Rep. of Germany | 33/199 R |
| 2200432 | 10/1972 | Fed. Rep. of Germany | 33/199 B |
| 241025 | 8/1969 | U.S.S.R. | 33/199 B |

Primary Examiner—Charles E. Phillips
Attorney, Agent, or Firm—William W. Haefliger

[57] ABSTRACT

A thread gaging tool having a clamp member for rigidly clamping to a pipe end includes an axially sliding assembly coupled to a linear computer input transducer and supporting a pivoted arm provided with a gage pin which is inserted into the pipe thread to precisely measure the distance of each thread wall from the pipe end.

11 Claims, 4 Drawing Figures

THREAD GAGE

SUMMARY OF THE INVENTION

This invention relates to gages for the accurate measurement of relatively large threads and particularly to a computer-coupled gaging tool for measuring pipe threads which may have progressively-varying pitches and widths along their helical lengths.

Most present day pipes are provided with a tapered "V-type" thread externally cut on each end of the pipe for mating with an identical but internal thread in a pipe coupling or "box end" of an adjacent pipe. While adequate for conveying most common fluids at relatively low pressures, pipes having V-threads are not particularly practical when it becomes necessary to thoroughly seal each joint against high internal pressures because the V-threads, when tightened to seal against leakage, create banding forces which tend to shrink the pin end having the external thread and to expand the box end having the internal thread. The pipe joint is thus forced open and the high internal pressures may force the contained fluids through the joint, thereby resulting in failure of the pipe joint.

A relatively recent invention for an improved pipe connection, described and disclosed in U.S. Pat. No. 3,989,284, employs threads having a dovetail cross-section with greater width at the outside diameter of the thread than at its root so that when interengaged threads are tightened, the box member with the internal thread is hoop-compressed and the pin member is forced into hoop tension, thus providing a rigid, sealed connection. To produce such a dovetail interlock between internal and external threads and to further improve the interlocking capabilities of the joint, each thread is carefully cut with a gradual taper along its helical length. During the joining operation, the junction of the two pipe members will be quite loose until the mating threads tightly interconnect by the actions of both the transversely dovetailed and longitudinally-tapered thread-wall profiles. The rigid seal connection of the threads described in the above-mentioned patent thereby renders pipes so equipped suitable for use as well casing or for transporting high-pressure, dangerous fluids which may result in serious damage if permitted to leak into the environment.

It is apparent that the above-described threads must be accurately cut. It therefore follows that the varying-pitch dovetail threads must be precisely gaged during the quality control step of production. It is obviously a simple operation to accurately measure the dovetail angle between the root diameter and the thread flank wall. The accurate measurement of thread width and pitch distance along the axial length is a more complex measurement, and to accurately make this measurement within the 0.0001 inch tolerances required, it has heretofore been necessary to hand-gage the threads, a very slow and costly production step.

Briefly described, the present invention is a computer input gaging tool which permits accurate measurement of thread pitches and widths which vary along the helical length of a square or dovetail pipe thread. The gage permits inside or outside thread measurement by use of an axial slide member supporting a gage pin which is manually positioned against each thread wall. When a predetermined gaging force is exerted by the operator, a spring-loaded trigger in the handle signals a system computer, not a part of this invention, to read a linear encoder coupled to the slide member so as to indicate the distance between the pipe end and the thread flank wall being measured.

DRAWING DESCRIPTION

In the drawings which illustrate a preferred embodiment of the invention:

DETAILED DESCRIPTION

Figure 1:
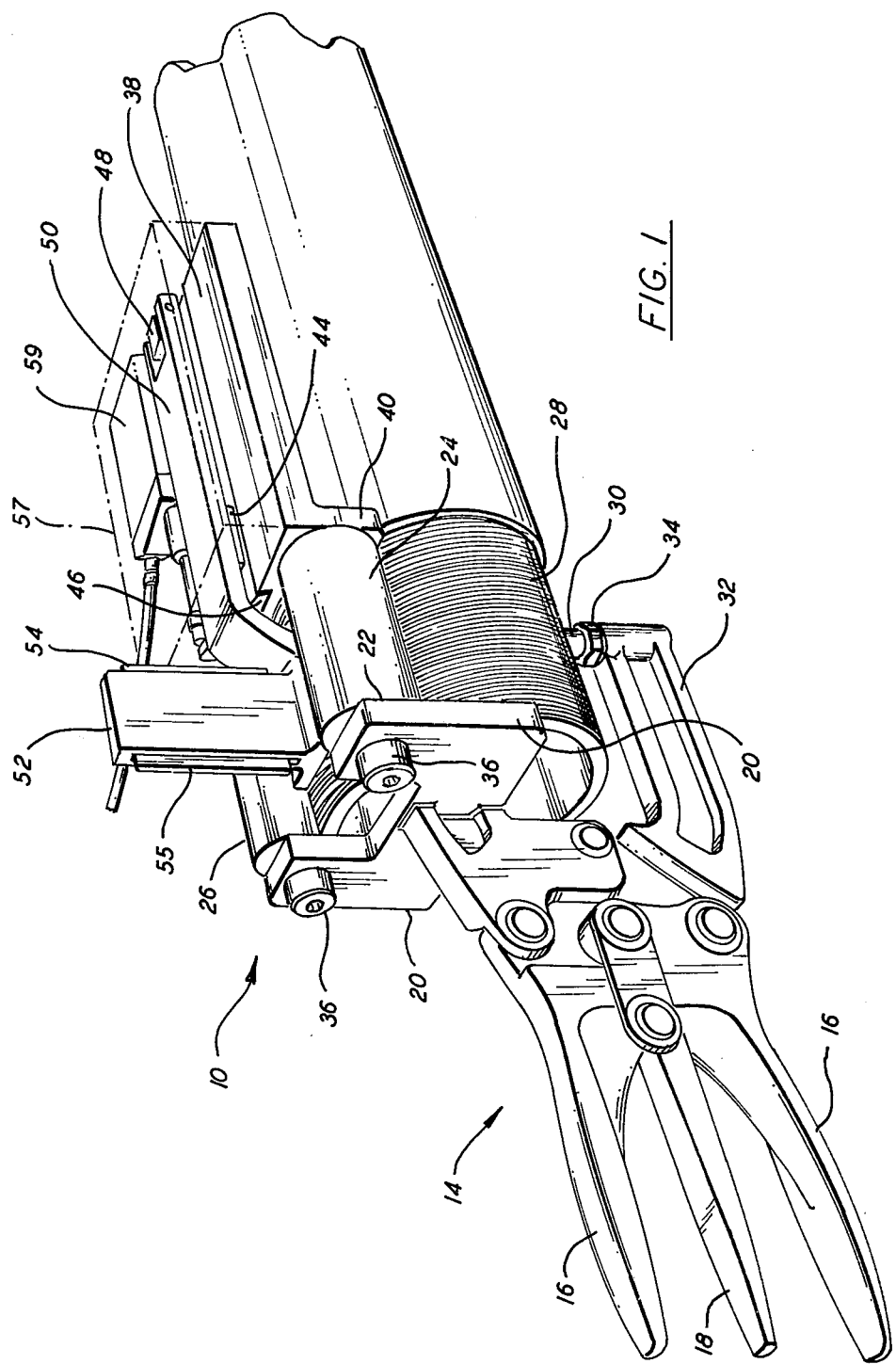
FIG. 1 is a perspective drawing illustrating the thread gage in position to measure external pipe threads.

Illustrated in FIG. 1 is a thread gage 10 made in accordance with the invention, clamped to the externally threaded end 28 of a pipe 12. Thread gage 10 includes a toggle clamp 14 which is locked by squeezing together the manually operated handles 16 and released with an unlocking trigger 18. The upper jaw of the clamp 14 is welded to a U-shaped end stop 20 having a flat surface 22 which is perpendicular to the axis of the pipe 12 and which provides a locating surface against which the threaded end of pipe 12 is registered. The upper arms of the end stop 20 rigidly support a pair of cylinders 24 and 26 which locate the gage relative to the axial centerline of the threaded portion 28 of the pipe 12. The clamping member is provided by a cushioned spindle 30 positioned in the end of the lower jaw 32 of the clamp 14 and located opposite cylinders 24 and 26. This spindle can be adapted to various pipe diameters by means of an adjustment nut 34.

Cylinders 24 and 26 each have a length which is slightly less than the length of the thread 28 and, if necessary, may be replaced with longer or shorter pairs of cylinders by removal of the bolts 36 which rigidly fasten the cylinders to the end stop 20. Bolts 36 extend through the axis of the cylinders 24 and 26 to rigidly attach a slide base 38 to the ends of cylinders 24 and 26. Slide base 38 includes an inverted U-shaped member 40 which receives the bolts 36, and has a center portion which is relieved to clear the pipe 12 and threads 28 in order to permit the cylinders 24 and 26 to make proper contact. Slide base 38 lies adjacent to but not touching the surface of pipe 12 and in a plane parallel to the longitudinal axis of the pipe.

Running in a dovetail track in the slide base 38 and in a plane parallel to the longitudinal axis of the pipe 12 is a linear slide assembly 46 which has, on the end farthest from the pipe end, a pivot block 48. Linear slide assembly 46 supports an arm 50 which is pivoted to the pivot block 48 at one end and carries at its opposite end a handle 52 containing spring-actuated triggers 54 and 55 and, as best illustrated in FIG. 2, a gaging pin 56 which protrudes from the lower surface of the arm 50 to engage the threads in the end of pipe 12.

Mounted to the slide base 38 and positioned to measure the longitudinal travel of the linear slide assembly 46 is a linear encoder 59 which provides input data on an associated computer, not part of this invention, when appropriately signaled by the triggers 54 or 55 as will be subsequently explained. If desired, the encoder 59 may be enclosed with a suitable cover 57 shown in dashed lines.

Figure 2:
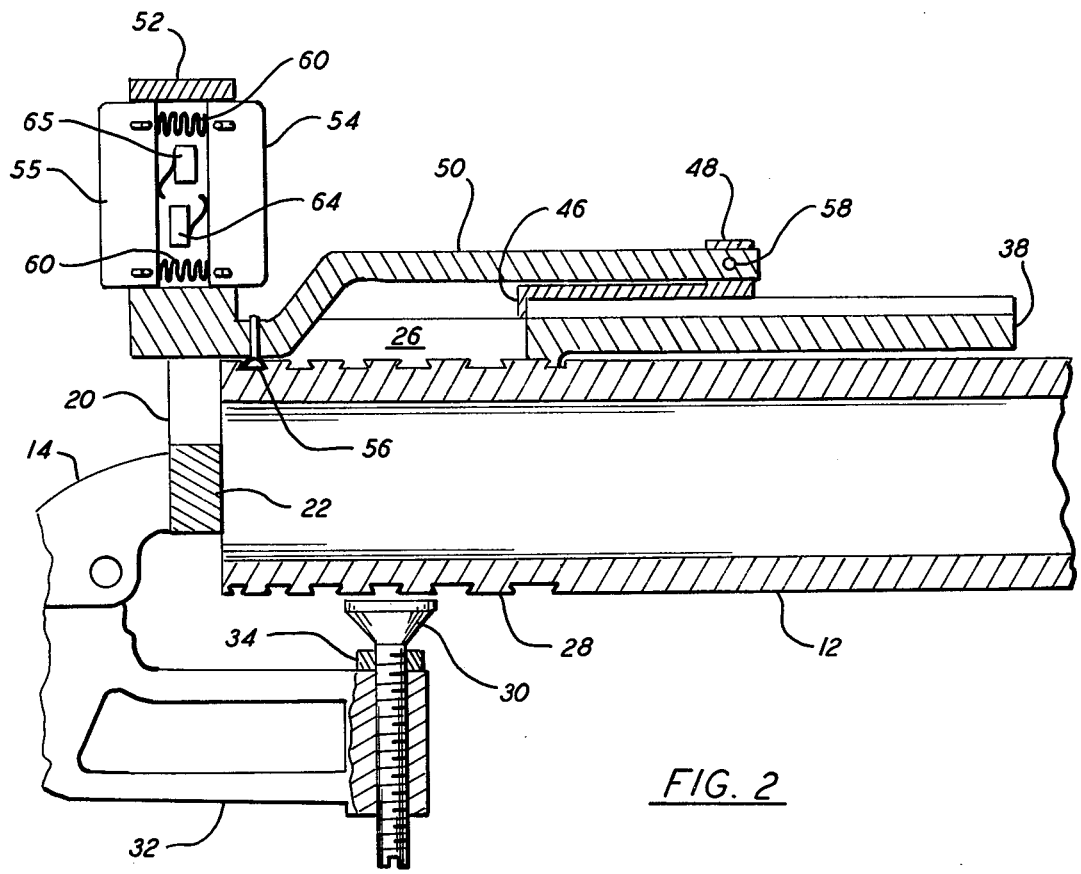
FIG. 2 is a sectional drawing of the thread gage and pipe illustrated in FIG. 1.

FIG. 2 is a sectional elevation view of the pipe 12 and the mounted gage 10 illustrated in FIG. 1. Surface 22 of the end stop 20 is positioned as shown against the end of pipe 12 and slide base 38, in close proximity to the surface of the pipe 12, is supported by the cylinder 26. Located within the slide base 38 is the linear slide assembly 46 shown at its position for measuring the thread closest to the end of pipe 12. The pivoted arm 50 is coupled to the pivot block 48 on the linear slide assembly 46 by a pivot pin 58 which permits the arm to be raised or lowered as needed so that the gaging pin 56 protruding from the lower surface of the arm 50 may engage the threads in the threaded section 28. Mounted to the top surface of the arm 50 is handle 52 containing a pair of triggers 54 and 55 which are forced apart by springs 60. Electrical switches 64 and 65 are positioned so as to be actuated by the depression of the triggers 54 and 55, respectively.

Figure 3:
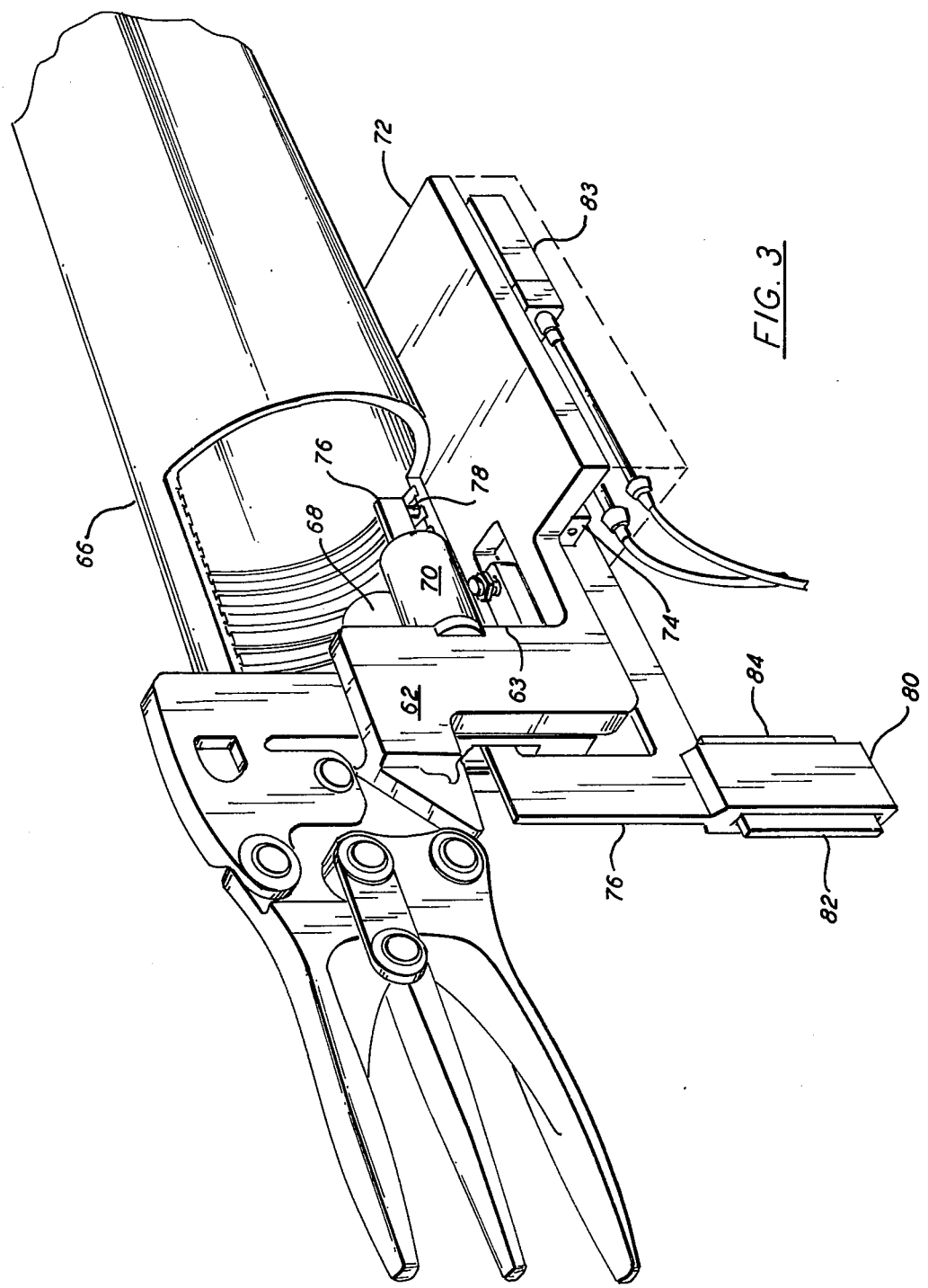
FIG. 3 is a perspective drawing illustrating a second embodiment adapted to measure internal pipe threads.

FIG. 3 is a perspective view illustrating an alternate embodiment for measuring internal threads of the type described. The gage assembly of FIG. 3 is similar to that described in connection with FIGS. 1 and 2 and includes the end stop 62 containing the surface 64 which contacts the end of the pipe 66 and which supports cylinders 68 and 70 and the slide base 72 containing a linear ball slide 74. It will be noted that the cylinders 68 and 70 are located within the bore of pipe 66 so that they contact the machined surface of the threaded portion to thereby accurately locate the gage. In the embodiment illustrated in FIG. 3, the linear ball slide assembly 74, which is similar to that illustrated in FIGS. 1 and 2, now supports a pivoted arm 76 which is bent over the face of the pipe and enters the bore of the pipe 66. Mounted near the end of the arm 76 and within the pipe 66 is a gage pin 78 which, as in the previous embodiment, is preferably in the form of a flattened sphere protruding from the surface of the arm 76. As with the external thread gage described above, the pivoted arm 76 also carries a handle 80 so that the gage pin 78 can be manually located within each of the threads to be gaged. Handle 80 contains a pair of triggers 82 and 84 which perform the same functions as triggers 54 and 55 in handle 52. As with the embodiment of FIG. 1, a linear encoder 83 is mounted to the slide base 72 to measure relative movement between the base 72 and the linear slide assembly 74.

OPERATION

In operation, the thread gage of FIGS. 1 and 2 is clamped to the end of the pipe with the surrface 22 of the end stop 20 in contact therewith. The handle 52 is lifted so that arm 50 pivots about the pin 58 and the linear ball slide assembly 46 is appropriately positioned for measuring either the threads distal or proximal the end of the pipe 12. Handle 52 is then positioned so that the gaging pin 56 is located within the first thread space to be gaged and trigger 54 is pulled toward the operator so that the gaging pin 56 will come in tight contact with the left or forward flank wall of the first thread. When sufficient force has been exerted against trigger 54, the springs 60 will compress to the point where the switch 64 will close, thereby transmitting a signal to the associated computer, instructing it to sample the linear encoder 59. Thereafter, the operator exerts force in the opposite direction against trigger 55 so that gaging pin 56 is forced against the right or rear flank of the first thread being measured. As before, when sufficient force is exerted, the switch 65 will transmit the sampling signal to the computer which is appropriately programmed to correct for the geometrical effects of using a spherical gaging pin 56 so as to render an accurate indication of the width of the thread space of the first thread being gaged. If it is desired that the bottom surface of the gaging pin 56 be held from contacting the floor or root diameter of the thread, a spacer pad 44 may be inserted between the upper surface of the linear ball slide assembly 46 and the adjacent lower surface of the arm 50, as illustrated in FIG. 1.

The operation of the internal thread gage of FIG. 3 is similar. The gage assembly is clamped to the end of the pipe 66 with the arm 76 entering the bore of the pipe 66 and the slide assembly 74 appropriately positioned so that the gage pin 78 can enter the first thread space to be measured. The operator thereupon applies a downward pressure to the outboard end of arm 76 so that gage pin 78 will enter the thread space. Thereupon the operator applies force to either handle 82 or 84 in the handle 80 so that the gaging pin 76 will contact first the left or forward flank and then the right or rear flank of the internal thread space. As above, the positional information from the linear encoder measuring the amount of travel of the linear ball slide assembly 76 is read into the computer when the operator applies appropriate force to the triggers 82 or 84.

Figure 4:
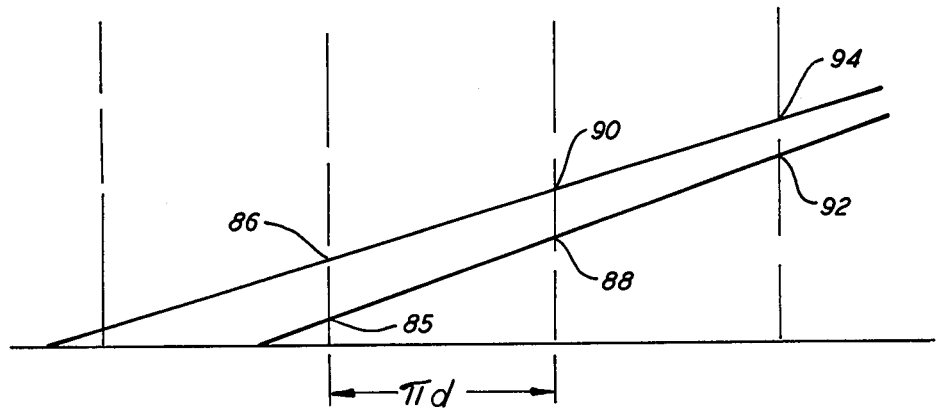
FIG. 4 is a graph representing a typical pipe thread "unwrapped" from the circumference of the pipe.

The described operation of triggers 54 and 55 of FIG. 2 or triggers 82 and 84 of FIG. 3 by the operator will produce linear encoder output signals which may be plotted as illustrated in FIG. 4, in which the point 85 represents the encoder reading of the thread space wall closest to the end of the pipe, and point 86 represents the reading of the opposite thread space wall in the same thread position. Similarly, the thread space next adjacent to the pipe end may be read and plotted at points 88 and 90 and the third thread space read and plotted at points 92 and 94. These encoder readings for each tooth flank are suitably corrected in the computer for the effects of the gage pin diameter and the resulting plot shown in FIG. 4 may be mathematically shifted within the computer until it coincides with a similar pair of straight lines established by the gage points and dimensions given in the thread specification. This will determine the phase relationship (or angle) about the pipe axis between the gage points and the points actually measured. Once this relationship is known, the actual thread errors can be computed.

Dovetail threads of the type described herein are occasionally cut with various diameters or spiroid diameters as described in the aforementioned U.S. Pat. No. 3,989,284. To gage this type of thread, similar fixtures are employed, the main differences being that stepped or conical locators are used and a crowned end is given to the gaging pin so that it can locate vertically against the thread root. This embodiment requires that a second linear encoder be mounted at right angles to the first to monitor the vertical movement of the pivoted arm. The thread error calculations, while more complex than those outlined herein, would be similar in nature.

What is claimed is:

1. A tool for gaging thread pitch and width at a plurality of locations in threads in the end of a pipe, said tool including:

a base element having at least one flat surface;

clamp means for clamping said base element to the pipe with said base element flat surface parallel with the longitudinal axis of said pipe and at a predetermined spacing from the threaded end of said pipe;

a movable member slidably coupled to said base element flat surface, said movable member being movable along said flat surface in only a direction parallel with the longitudinal axis of said pipe;

an arm coupled to said movable member having a portion overlying the threads in said pipe;

a gage pin mounted in the portion of said arm overlying said threads and positioned therein for insertion in said threads;

measuring means for measuring the relative movement between said base element and said movable member; and a handle mounted on said arm for inserting and positioning said gage pin in said threads, said handle including at least one spring-loaded trigger and a switch coupled to said trigger for interrogating said measuring means when a predetermined force is exerted against said trigger.

2. The tool claimed in claim 1 wherein said handle contains first and second spring-loaded trigger units, said first unit positioned in said handle for actuation by a predetermined pulling force, said second unit positioned for actuation by a predetermined pushing force.

3. The tool claimed in claim 1 wherein said measuring means is a linear encoder for providing electrical input signals to an external computer.

4. The tool claimed in claim 1 wherein said movable member is coupled to said base element by a dovetail track in the flat surface of said element.

5. The tool claimed in claim 1 wherein said movable member includes a pivot block on the flat surface of the base element, said pivot block having a pivot pin on an axis parallel with said flat surface and perpendicular to the longitudinal axis of said pipe, said pivot pin coupling the first end of said arm to said movable member.

6. The tool claimed in claim 1 wherein said clamp means includes at least two positioning cylinders having lengths not greater than the length of the threads in said pipe, the axis of each cylinder being parallel with the longitudinal axis of said pipe, the arcuate surface of each cylinder being in contact with the surface of said threads.

7. The tool claimed in claim 6 wherein said clamp means further includes an adjustable cushioned spindle positioned on the surface of said pipe substantially opposite to a point midway between said cylinders, said spindle providing a third clamping point for said tool on said pipe.

8. The tool claimed in claim 6 wherein said cylinders are located within the bore of said pipe and on internal threads in the end of said pipe.

9. The tool claimed in claim 6 wherein said arm is located within the bore of said pipe, and said gage pin is located for insertion in internal threads in said pipe.

10. The tool claimed in claim 6 wherein said cylinders are located on the outer surface of said pipe and on the external threads in the end of said pipe.

11. The tool claimed in claim 6 wherein the arm is located adjacent the outer surface of said pipe, and said gage pin is located for insertion in external threads in said pipe.

* * * * *